United States Patent
Lee et al.

(10) Patent No.: US 8,237,938 B2
(45) Date of Patent: Aug. 7, 2012

(54) METHOD AND APPARATUS TO CREATE COLOR CONVERSION PROFILES

(75) Inventors: Hee-ran Lee, Seoul (KR); Joo-young Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1278 days.

(21) Appl. No.: 11/951,475

(22) Filed: Dec. 6, 2007

(65) Prior Publication Data

US 2008/0137116 A1    Jun. 12, 2008

(30) Foreign Application Priority Data

Dec. 8, 2006  (KR) .................. 10-2006-0124792

(51) Int. Cl.
*G06F 3/12*    (2006.01)
(52) U.S. Cl. ........ 358/1.13; 345/590; 345/604; 358/2.1; 358/448; 358/518; 358/523; 382/162; 382/167
(58) Field of Classification Search ........... 358/1.13, 358/1.15, 1.18, 1.9, 2.1, 448, 518, 523; 345/501, 345/590, 591, 600, 604; 382/162, 167
See application file for complete search history.

(56) References Cited

U.S. PATENT DOCUMENTS

| | | | |
|---|---|---|---|
| 6,490,053 B1 * | 12/2002 | Takahashi et al. | 358/1.18 |
| 2004/0207869 A1 * | 10/2004 | Endo | 358/1.15 |
| 2004/0233484 A1 * | 11/2004 | Seko et al. | 358/523 |
| 2005/0100211 A1 * | 5/2005 | Gibson et al. | 382/162 |
| 2006/0028664 A1 * | 2/2006 | Ono | 358/1.9 |

FOREIGN PATENT DOCUMENTS

| | | |
|---|---|---|
| EP | 0665680 | 8/1995 |
| KR | 2006-14927 | 2/2006 |
| KR | 2006-62344 | 6/2006 |

OTHER PUBLICATIONS

Chinese Office Action issued Sep. 3, 2010 in CN Application No. 200710307156.4.

* cited by examiner

*Primary Examiner* — King Poon
*Assistant Examiner* — David S Cammack
(74) *Attorney, Agent, or Firm* — Stanzione & Kim, LLP

(57) ABSTRACT

Disclosed are an image forming apparatus and an image forming method thereof. The image forming method includes: selecting at least one among plural scanning profiles needed for color management at a scanning operation of a document and plural printing profiles needed for the color management at a printing operation of the document according to a user's input; and generating a printing image based on the selected scanning and printing profiles and a preset scanning or printing profile.

16 Claims, 5 Drawing Sheets

METHOD AND APPARATUS TO CREATE COLOR CONVERSION PROFILES

CROSS-REFERENCE TO RELATED APPLICATIONS

This application claims priority from Korean Patent Application No. 2006-0124792, filed on Dec. 8, 2006 in the Korean Intellectual Property Office, the disclosure of which is incorporated herein by reference.

BACKGROUND OF THE INVENTION

1. Field of the Invention

Apparatuses and methods consistent with the present invention relate to an image forming apparatus and an image forming method thereof, and more particularly, to an image forming apparatus capable of selecting a profile and an image forming method thereof.

2. Description of the Related Art

An image forming apparatus such as a printer, a copier, multi-function peripherals, etc. receives print data from a host apparatus such as a computer, and forms an image based on the received print data on a recording medium. The host apparatus for the image forming apparatuses generates a document or the like print data so that the image forming apparatus can perform a printing operation.

The document to be printed by the image forming apparatus may be transmitted from various source devices such as a monitor, a scanner, a digital camera, etc. However, the image forming apparatus and these source devices are different in color representation, so that color transform or color matching is required for the image forming apparatus to generate a printing image for color copying of the document received from these source devices.

Meanwhile, a color profile may previously be prepared for the color transform or the color matching. The image forming apparatus may generate a printing image matching with each color representation.

However, since different manufacturers provide different color profiles and the color profile is stored in the image forming apparatus, a user has a troublesome work to update a firmware or to access the image forming apparatus through a separate application program in order to select a desired color profile.

Particularly, in case of scanning and printing operations, the color profile can be controlled through a driver provided in the image forming apparatus, but in case of a color-copying operation, the color profile stored in the image forming apparatus has to be replaced.

SUMMARY OF THE INVENTION

Accordingly, it is an aspect of the present invention to provide an image forming apparatus capable of eliminating difference in color representation, and an image forming method thereof.

Another aspect of the present invention is to provide an image forming apparatus capable of generating and using a separate copy profile from a plurality of color profiles.

Additional aspects of the present invention will be set forth in part in the description which follows and, in part, will be obvious from the description, or may be learned by practice of the present invention.

The foregoing and/or other aspects of the present invention can be achieved by providing an image forming method including: selecting at least one among plural scanning profiles needed for color management at a scanning operation of a document and plural printing profiles needed for the color management at a printing operation of the document according to a user's input; and generating a printing image based on the selected scanning and printing profiles and a preset scanning or printing profile.

The image forming method may further include: generating a copy profile based on the selected scanning profile or printing profile and the preset scanning or printing profile.

The image forming method may further include: storing the generated copy profile, wherein the generating the printing image includes generating the printing image based on the stored copy profile.

The selecting at least one among the plural scanning and printing profiles may be performed through either of an image forming apparatus for generating the printing image or a host apparatus of the image forming apparatus.

The image forming method may further includes: transmitting at least one among the plural scanning and printing profiles from the host apparatus to the image forming apparatus for generating the printing image.

The image forming method may further include transmitting at least one list of the plural scanning and printing profiles from the host apparatus to the image forming apparatus for generating the printing image.

The image forming method may further include displaying at least one list among the plural scanning and printing profiles in at least one of the image forming apparatus for generating the printing image and the host apparatus of the image forming apparatus.

Another aspect of the present invention is to provide an image forming apparatus including: an image forming unit which generates a printing image based on a scanning profile needed for color management at a scanning operation of a document and a printing profile needed for the color management at a printing operation of the document; and a controller which receives selection of at least one of the plural scanning and printing profiles according to a user's input, and controls the image forming unit to generate the printing image based on the selected scanning and printing profile and a preset scanning or printing profile.

The controller may generate a copy profile based on the selected scanning profile or printing profile and the preset scanning or printing profile.

The image forming apparatus may further include a storing unit to store the generated copy profile, wherein the controller controls the image forming unit to generate the printing image based on the stored copy profile.

The controller may receive selection of at least one among the plural scanning and printing profiles from either of the image forming apparatus or a host apparatus of the image forming apparatus.

The controller may receive at least one among the plural scanning and printing profiles from the host apparatus of the image forming apparatus.

The controller may receive at least one list of the plural scanning and printing profiles from the host apparatus of the image forming apparatus.

The controller may display at least one list among the plural scanning and printing profiles in at least one of the image forming apparatus for generating the printing image and the host apparatus of the image forming apparatus.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE PREFERRED EMBODIMENTS

Reference will now be made in detail to the embodiments of the present invention, examples of which are illustrated in the accompanying drawings. The exemplary embodiments are described below so as to explain the present invention by referring to the figures.

Figure 1:
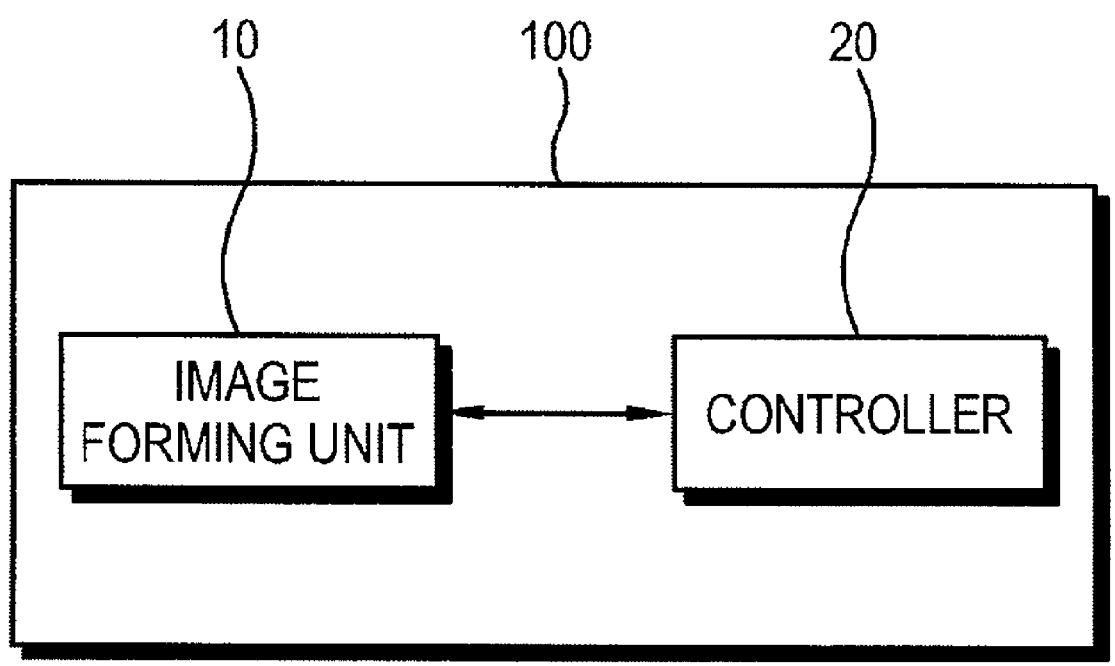
FIG. 1 is a block diagram showing a configuration of an image forming apparatus according to a first exemplary embodiment of the present invention.

FIG. 1 is a block diagram showing a configuration of an image forming apparatus 100 according to a first exemplary embodiment of the present invention. As shown in FIG. 1, the image forming apparatus 100 according to the first exemplary embodiment of the present invention includes an image forming unit 10 and a controller 20.

The image forming unit 10 forms a printing image on the basis of a scanning profile and a printing profile. The scanning profile is needed for color management at a scanning operation of a document, and the printing profile is needed for color management at a printing operation of the document. The image forming unit 10 performs an RGB (red, green and blue)-to-CMYK (cyan, magenta, yellow and black) transform based on the respective profiles.

Here, the scanning profile matches RGB colors of an input document to a profile color space (PCS), and the printing profile matches colors of the profile color space with CMYK colors.

The scanning profile and the printing profile may be based on one of an international color consortium (ICC) profile, an image color matching (ICM) profile, and a windows color system (WCS) profile.

In general, the respective profiles are stored to a color path of an operating system for the host apparatus. Further, the WCS profile is classified into a device model profile (DMP) that defines a relationship between colors for the image forming apparatus 100 and a standard color space; a color appearance model profile (CAMP) that defines a relationship between a transformed value and an ambient viewing condition; and a gamut map model profile (GMMP) that defines a matching relationship between devices having an unmatched color gamut.

Meanwhile, the respective profiles may be stored as a file or a look-up table.

The controller 20 receives selection of at least one among the plurality of scanning and printing profiles according to a user's input, and controls the image forming unit 10 to generate a printing image on the basis of the selected scanning and printing profiles and a preset scanning profile or a preset printing profile.

Here, the preset profiles may include a manufacturer's own default profile stored when the image forming unit 100 is manufactured.

The controller 20 generates a printing image based on the selected scanning and printing profiles if both the scanning profile and the printing profile are selected according to a user's input.

Further, the controller 20 generates a printing image based on the selected scanning profile and the preset printing profile if only the scanning profile is selected. On the other hand, the controller 20 generates a printing image based on the preset scanning profile and the selected printing profile if only the printing profile is selected.

Here, the controller 20 may generate a copy profile on the basis of the selected scanning or printing profile and the preset scanning or printing profile. The generated copy profile may be stored in a storing unit 30 or the color path of a host apparatus 300, which will be described later. The copy profile may be generated in the host apparatus 300 as well as the image forming apparatus 100. Here, the host apparatus 300 may include not only a host personal computer (PC) connected to an image forming apparatus 200 but also a server in which the respective profiles are stored.

According to an exemplary embodiment of the present invention, the controller 20 includes a nonvolatile memory (not shown) such as a read only memory (ROM) in which a computer program, a volatile memory (not shown) such as a random access memory (RAM) to load the stored computer program from in the nonvolatile memory, and a processor (not shown) such as a central processing unit (CPU) to execute the computer program loaded in the volatile memory.

Figure 2:
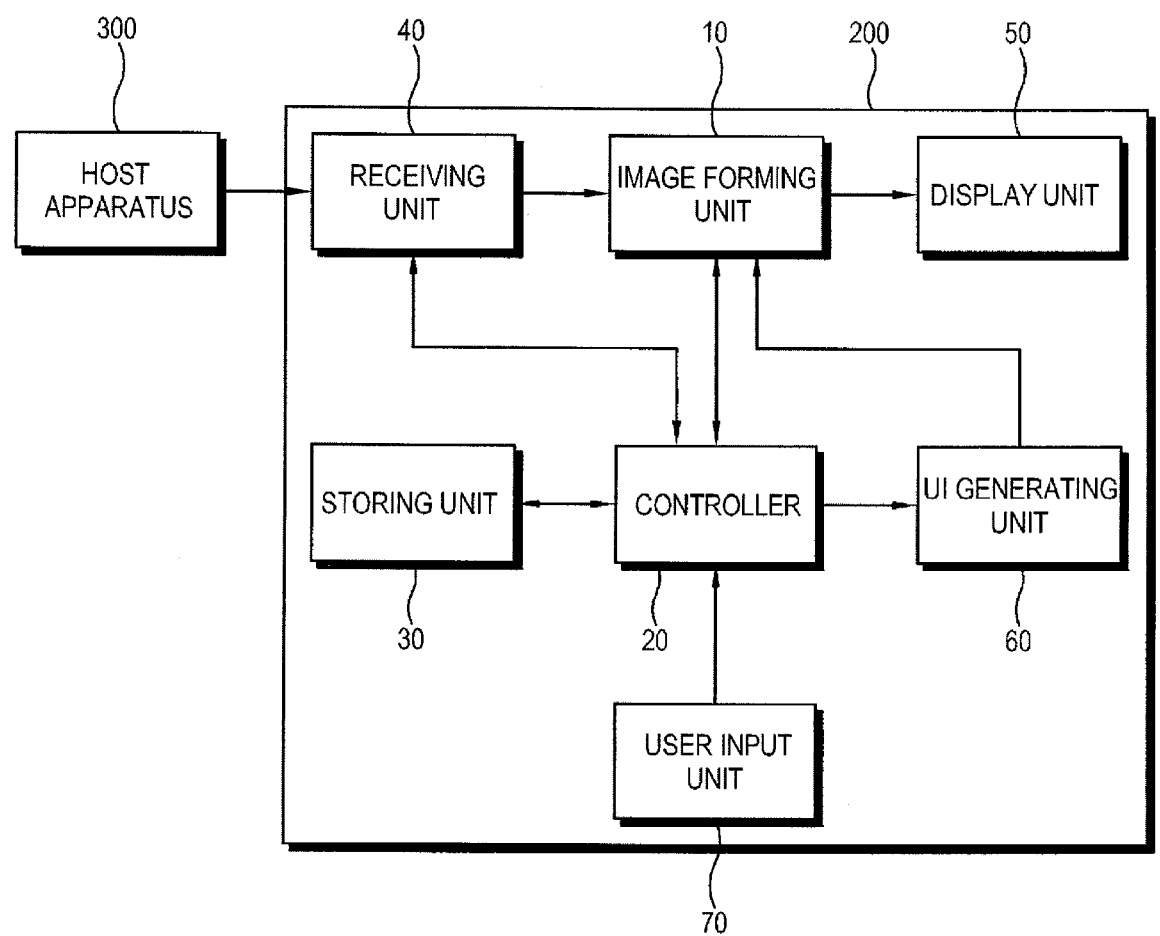
FIG. 2 is a block diagram showing a configuration of an image forming apparatus according to a second exemplary embodiment of the present invention.

FIG. 2 is a block diagram showing a configuration of an image forming apparatus according to a second exemplary embodiment of the present invention. As shown in FIG. 2, the image forming apparatus 200 according to the second exemplary embodiment of the present invention includes a storing unit 30, a receiving unit 40, a display unit 50, a user interface (UI) generating unit 60, and a user input unit 70 in addition to the configuration of the image forming apparatus 100 according to the first exemplary embodiment.

The storing unit 30 stores the copy profile generated on the basis of the scanning profile and the printing profile. Further, the storing unit 30 may respectively store the scanning and printing profiles received from the host apparatus 300 or may store a list of respective profiles, as well as the copy profile.

In this exemplary embodiment, the storing unit 30 may be embodied by a nonvolatile memory such as a flash memory and the like, a hard disk, or etc.

The receiving unit 40 receives at least one among the plurality of scanning profiles and the plurality of printing profiles from the host apparatus 300. The receiving unit 40 may receive only the list of respective profiles. Further, the receiving unit 40 may receive the copy profile from the host apparatus 300 if the copy profile is generated in the host apparatus 300.

If there is a user's input for color-copying, the controller 20 receives the list of respective profiles, controls the display unit 50 to display the list, and receives a profile selected by a user among the respective profiles. Alternatively, the respectively profiles may be stored in the storing unit 30 before selection of a user.

In this exemplary embodiment, the receiving unit 40 may be provided as not only a wired network connection but also a network connection to interconnect a plurality of electronic devices such as a wireless local area network (LAN) module, a Bluetooth module, etc.

The display unit 50 displays at least one of the list of scanning profiles and the list of printing profiles. If there is a user's input for the color-copying, the image forming apparatus 200 receives only the list of respective profiles from the host apparatus 300, displays the list on the display unit 50, and, if a user selects a profile from the list, receives the selected profile from the host apparatus 300.

In this exemplary embodiment, the display unit 50 may be realized as a light emitting diode (LED), a liquid crystal display (LCD) panel or other known displays in the art, and may be provided in at least one of the image forming apparatus 200 and the host apparatus 300.

The UI generating unit 60 generates a user interface (UI) to allow a user to select at least one among the plural scanning and printing profiles. If the copy profile is stored in the storing unit 30, the UI generating unit 60 may generate a UI for selecting the copy profile.

Like the display unit 50, the UI generating unit 60 may be provided in at least one of the image forming apparatus 200 and the host apparatus 300. Detailed descriptions of the UI will be described later with reference to accompanying drawings.

The user input unit 70 allows a user to select at least one of the plural scanning and printing profiles and receives a selection result.

Even though both the scanning profile and the printing profile have to be selected, if only one of the scanning profile and the printing profile is selected, the preset profile is used for the other one. Further, if the copy profile is generated and stored in the storing unit 30, a user selects only the copy profile so as to apply a desired color profile to the printing image.

In this exemplary embodiment, the user input unit 70 is provided in at least one of the image forming apparatus 200 and the host apparatus 300.

Below, a user interface 400 of the image forming apparatus 200 according to an exemplary embodiment of the present invention will be described in detail with reference to FIG. 3.

Figure 3:
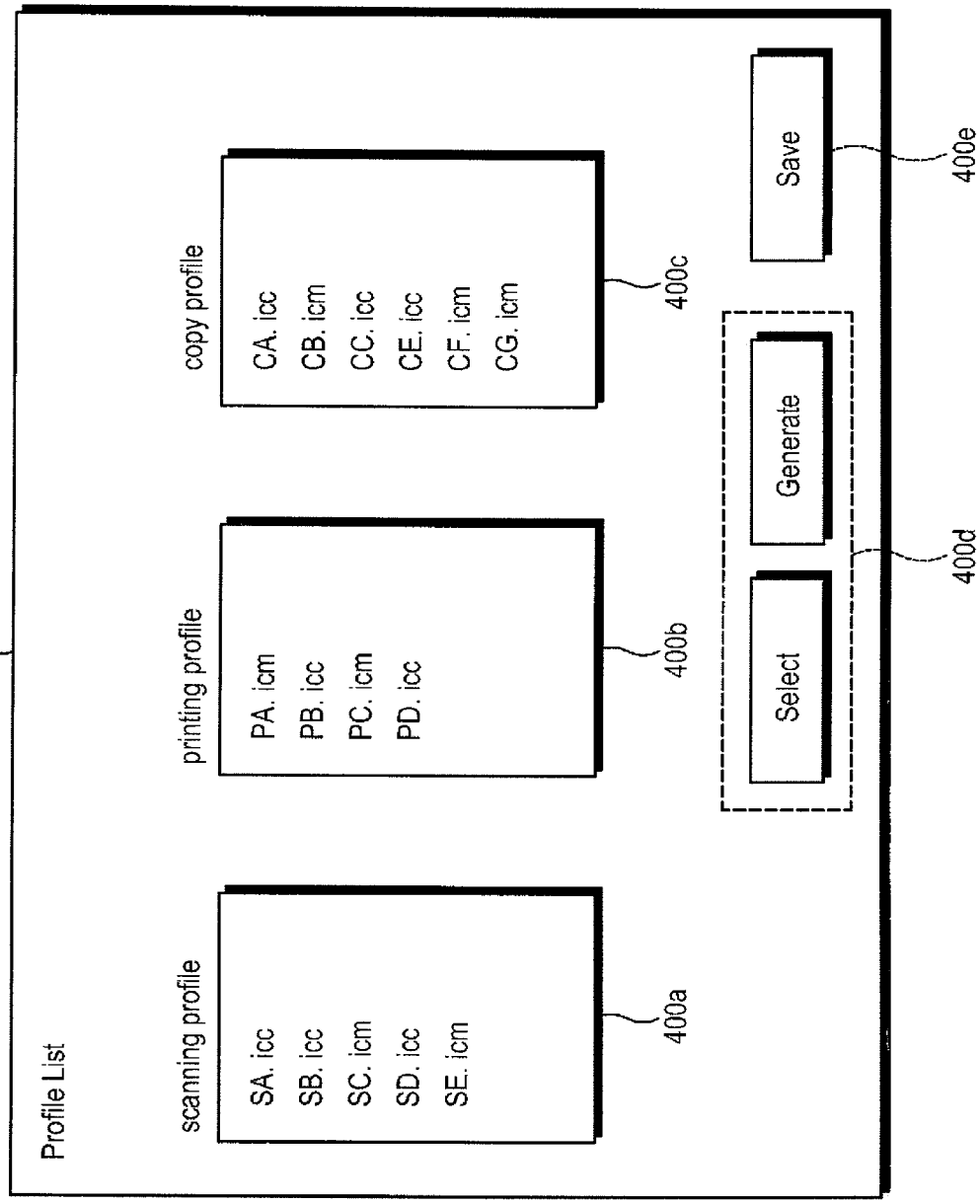
FIG. 3 is a view showing a user interface of the image forming apparatus according to an exemplary embodiment of the present invention.

As shown in FIG. 3, the user interface 400 according to this embodiment includes a window 400*a* for showing the list of scanning profiles, a window 400*b* for showing the list of printing profiles, a window 400*c* for showing the list of copy profiles, buttons 400*d* for selecting and generating the profile, and a button 400*e* for storing the generated profile.

If there is a user's input for the color-copying, the controller 20 receives each list of profiles and displays it on the corresponding window. If the respective profiles are not stored in the storing unit 30, the controller 20 receives the list of profiles from the host apparatus 300. On the other hand, if the respective profiles are stored in the storage unit 30, the controller 20 searches the stored profiles and displays the list of them through the corresponding interface.

A user may select each of the scanning profile and the printing profile to perform the color-copying. If only one of the scanning profile and the printing profile is selected, the other one is replaced with the preset profile.

Further, if a user clicks the button 400*d* for generating the copy-profile in the state that the scanning and printing profiles are selected, the controller 20 generate the copy profile based on the selected scanning and printing profiles.

A user can save the generated copy profile in the storing unit 30 by clicking the button 400*e* for saving the profile. If the copy profile is stored in the storing unit 30, a user can select the copy profile.

Figure 4:
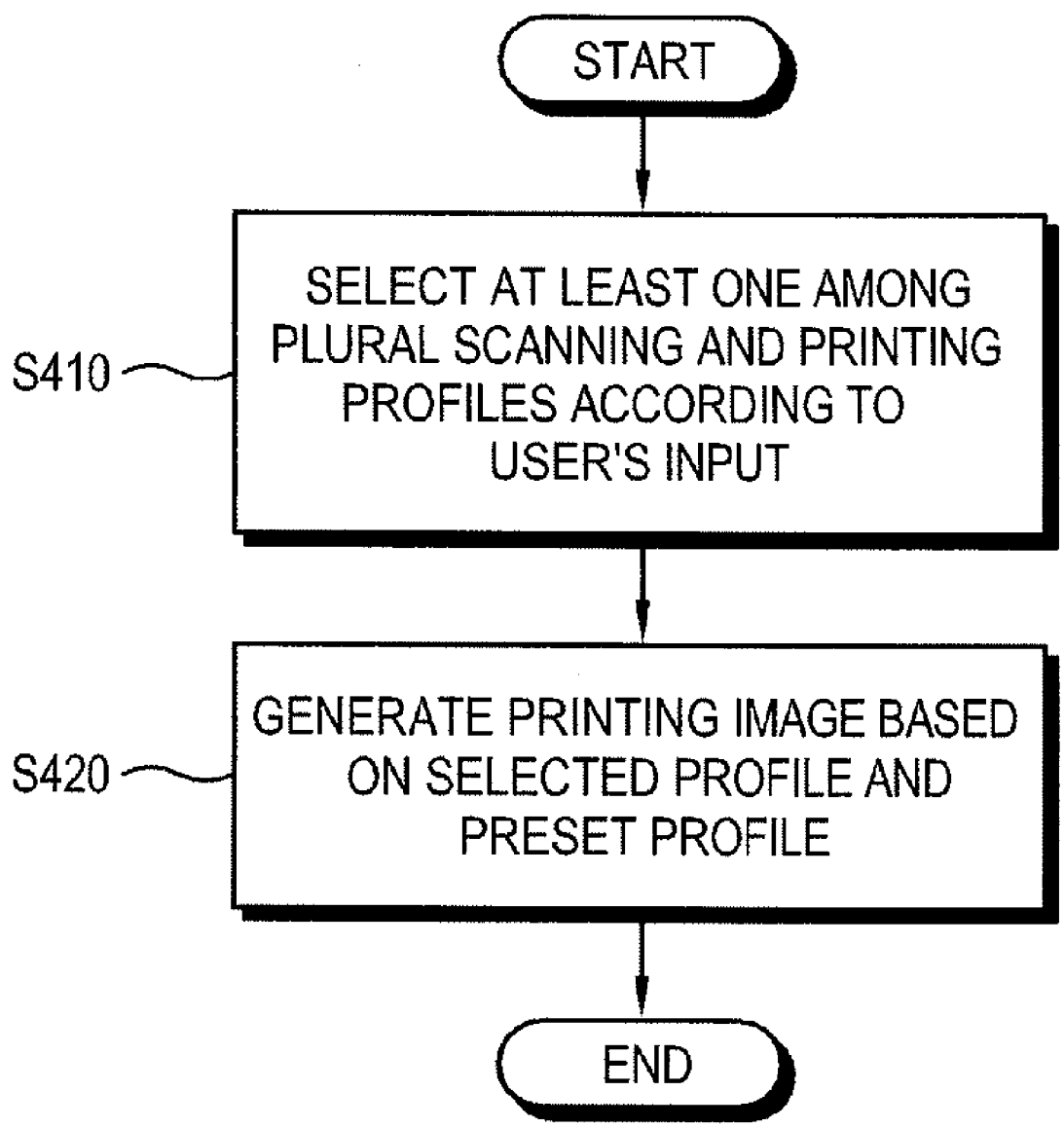
FIG. 4 is a flow chart for explaining an image forming method according to the first exemplary embodiment of the present invention.

Below, an image forming method according to the first exemplary embodiment of the present invention will be described with reference to FIG. 4.

First, at operation S410, the controller 20 selects at least one from the plurality of scanning profiles needed for the color management at the scanning operation of a document and the plurality of printing profiles needed for the color management at the printing operation of the document, according to a user's input.

At the operation S410, the controller 20 may receive the profile through at least one of the image forming apparatus 100,200 and the host apparatus 300.

At operation S420, the controller 20 generate a printing image based on the scanning and printing profiles selected at the operation S410 and the preset scanning or printing profile.

At the operation S420, the printing image may be generated on the basis of the selected scanning profile and the preset printing profile if only the scanning profile is selected, and may be generated on the basis of the preset scanning profile and the selected printing profile if only the printing profile is selected.

Meanwhile, the image forming method according to this embodiment may further include generating the copy profile based on the scanning and printing profiles selected at the operation S410 and the preset scanning or printing profile.

In addition, the image forming method may further include saving the generated copy profile, to generate the printing image based on the stored copy profile in the operation S420.

Further, the image forming method may include transmitting at least one of the plural scanning and printing files from the host apparatus 300 to the image forming apparatus 100. Alternatively, each list of profiles may be transmitted instead of the respective profiles.

Also, the image forming method may further include displaying at least one list of the plural scanning and printing profiles.

Figure 5:
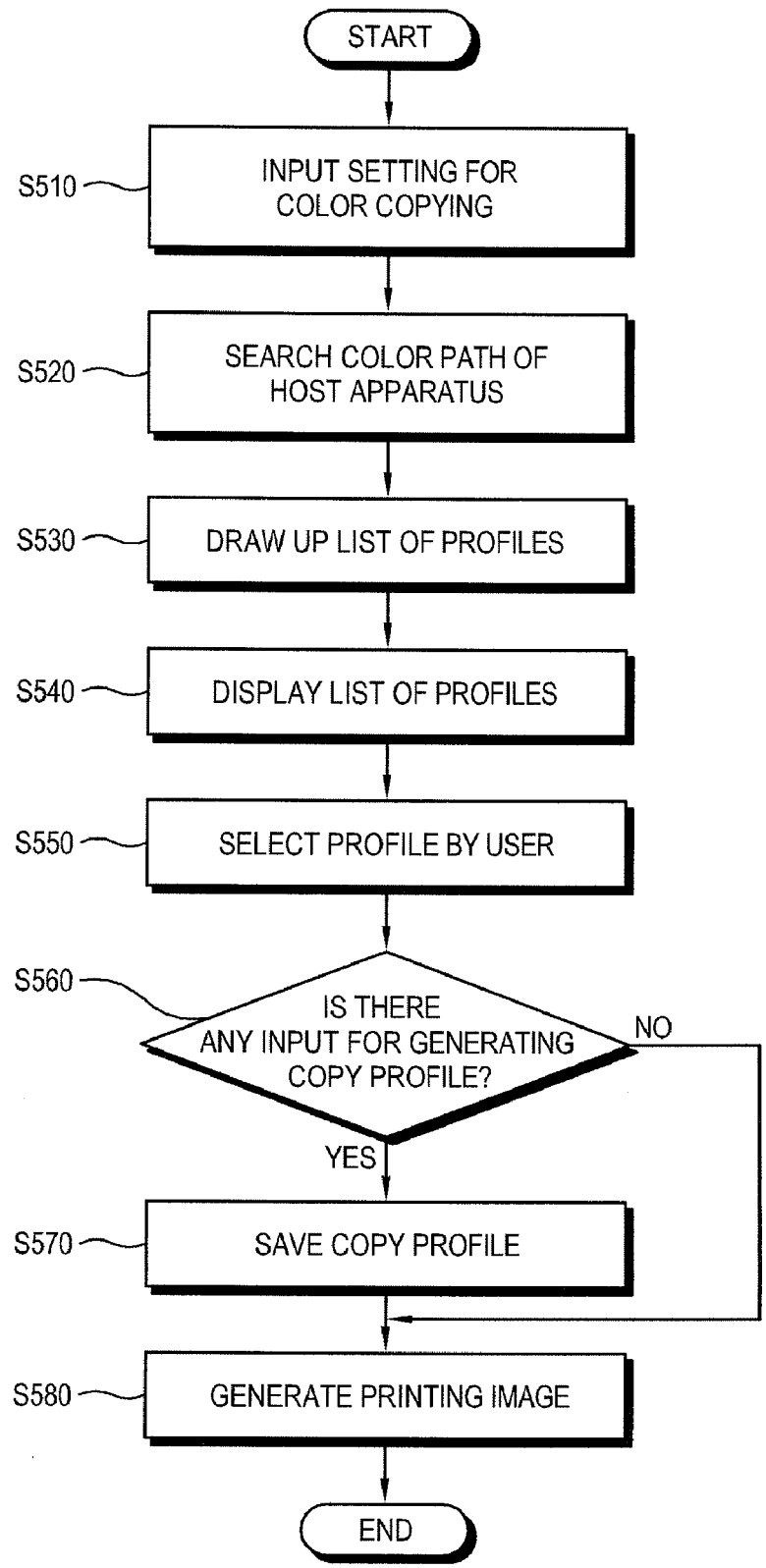
FIG. 5 is a flow chart for explaining an image forming method according to the second exemplary embodiment of the present invention.

Below, an image forming method according to the second exemplary embodiment of the present invention will be described with reference to FIG. 5.

First, the controller 20 receives setting for the color-copying at operation S510, searches the color path of the host apparatus 300 at operation S520, and draws up the list of profiles at operation S530.

At operation S540, the controller 20 displays the list of profiles which are drawn up at the operation S530. Further, the controller 20 receives selection of profiles by a user at operation S550, and determines whether there is any input for generating the copy profile at operation S560. If it is determined that there is an input for generating the copy profile at the operation S560, the controller 20 saves the copy profile at operation S570, and generates a printing image based on the saved copy profile at operation S580. On the other hand, if it is determined that there is no input for generating the copy profile at the operation S560, the printing image generated at the operation S580 may be based on the selected scanning and printing profiles.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:
1. An image forming method comprising:
displaying plural scanning profiles or plural printing profiles to be selected by a user;
selecting at least one among the displayed plural scanning profiles needed for color management at a scanning operation of a document and the displayed plural print- ing profiles needed for the color management at a printing operation of the document according to the user's input; and in response to an input by the user to generate a copy profile, generating the copy profile based on the selected scanning profile or printing profile and a preset scanning or printing profile, storing the generated copy profile, and generating a printing image based on the stored copy profile, otherwise, generating a printing image based on the selected scanning and printing profiles and the preset scanning or printing profile.

2. The image forming method according to claim 1, wherein the selecting at least one among the plural scanning and printing profiles is performed through either of an image forming apparatus for generating the printing image or a host apparatus of the image forming apparatus.

3. The image forming method according to claim 1, further comprising: transmitting at least one among the plural scanning and printing profiles from the host apparatus to the image forming apparatus for generating the printing image.

4. The image forming method according to claim 1, further comprising transmitting at least one list of the plural scanning and printing profiles from the host apparatus to the image forming apparatus for generating the printing image.

5. The image forming method according to claim 1, further comprising displaying at least one list among the plural scanning and printing profiles in at least one of the image forming apparatus for generating the printing image and the host apparatus of the image forming apparatus.

6. The image forming method according to claim 1, wherein the copy profile is stored in a storage unit of an image forming apparatus for generating the printing image.

7. The image forming method according to claim 1, wherein the generating the copy profile is performed through an image forming apparatus for generating the printing image.

8. The image forming method according to claim 7, wherein the selecting at least one among the plural scanning and printing profiles is performed through the image forming apparatus for generating the printing image.

9. The image forming method according to claim 1, wherein the preset scanning or printing profile is automatically provided during the generation of the printing image and during the generation of the copy profile.

10. An image forming apparatus comprising:
a display for displaying plural scanning profiles or plural printing profiles to be selected by a user;

an image forming unit which generates a printing image based on the displayed profile needed for color management at a scanning operation of a document and the displayed printing profile needed for the color management at a printing operation of the document, or generates a printing image based on a generated and stored copy profile; and a controller which receives selection of at least one of the plural scanning and printing profiles according to the user's input and an input by the user to generate the copy profile, the controller controlling the image forming unit to generate the copy profile based on the selected scanning profile or printing profile and a preset scanning or printing profile, to store the generated copy profile, and to generate the printing image based on the generated and stored copy profile in response to the input by the user to generate the copy profile, otherwise, the controller controlling the image forming unit to generate the printing image based on the selected scanning and printing profile and the preset scanning or printing profile.

11. The image forming apparatus according to claim 10, wherein the controller receives selection of at least one among the plural scanning and printing profiles from either of the image forming apparatus or a host apparatus of the image forming apparatus.

12. The image forming apparatus according to claim 10, wherein the controller receives at least one among the plural scanning and printing profiles from the host apparatus of the image forming apparatus.

13. The image forming apparatus according to claim 10, wherein the controller receives at least one list of the plural scanning and printing profiles from the host apparatus of the image forming apparatus.

14. The image forming apparatus according to claim 10, wherein the controller displays at least one list among the plural scanning and printing profiles in at least one of the image forming apparatus for generating the printing image and the host apparatus of the image forming apparatus.

15. The image forming apparatus according to claim 10, wherein the image forming apparatus further comprise a storage unit and wherein the copy profile is stored in the storage unit of the image forming apparatus.

16. The image forming apparatus according to claim 10, wherein the preset scanning or printing profile is automatically provided during the generation of the printing image and during the generation of the copy profile.

* * * * *